UNITED STATES PATENT OFFICE.

SADAKICHI SATOW, OF SENDAI, JAPAN.

RUBBER SUBSTITUTE AND PROCESS OF MAKING THE SAME.

1,245,979. Specification of Letters Patent. Patented Nov. 6, 1917.

No Drawing. Application filed December 11, 1916. Serial No. 136,299.

*To all whom it may concern:*

Be it known that I, SADAKICHI SATOW, a subject of the Emperor of Japan, residing at Sendai, Japan, have made a certain new and useful Invention in Rubber Substitute and Processes of Making the Same, of which the following is a specification.

This invention relates to rubber substitute having the properties of rubber and the process of making the same.

The object of the invention is to provide a substitute for rubber, and an economical process for making the same.

A further object of the invention is to provide a rubber substitute which may be used for all purposes for which rubber is adapted, and which is made from vegetable proteidal substances.

Further objects of the invention will appear more fully hereinafter.

The methods heretofore proposed for the manufacture of rubber substitute are open to many and serious objections. The products of the methods heretofore proposed have in many instances fallen far short of the desired efficiency as suitable rubber substitutes because of their failure to possess one or more of the desirable characteristics of rubber. Again, the proposed methods, in many instances, have proven expensive and inefficient because of the time required in carrying them out and the nature of the materials employed, and the inability to properly and easily control the degree of hardness or softness of the product.

It is among the special objects of my present invention to provide a substitute for rubber, and a process of making the same, which avoids the objections referred to and which product is difficultly inflammable, can be quickly, easily and economically made and rolled into any desired thickness or otherwise formed or molded into any desired shape, with any desired degree of hardness or softness and having the desirable characteristics of elasticity, flexibility and strength of rubber.

In carrying out my invention I employ vegetable proteids or proteidal substances which are glutinized with suitable agents into a sticky viscid mass. This mass may be used as a coating for cloth, textile, or other fabric, either with or without vulcanization or it may be transformed into proteidal condensation products by the action of an active methylene compound, and rolled into sheets or molded into form, or applied to the fabric and vulcanized; or to the glutinized mass, whether or not treated with the active methylene compound, may be added a suitable vulcanized oil and the mass may then be applied to a fabric or molded or rolled into sheets or other form, for use as an artificial rubber. Suitable pigments or coloring matter may also be employed, as well as difficultly drying substances such as oxidized oils, triphenyl-glycerin, or the like.

The proteids are procured from any suitable raw proteid containing material such as beans, peas, wheat, corn or other leguminous cereal or grain products.

The proteid containing raw material is crushed to break down the cellular structure thereof, and if it contains an undesirable percentage of oil, the oil content is removed. This may be effected in any suitable manner, as, for example, by treating the mass with an oil solvent such as benzin. The oil solvent is then removed from the mass. The proteidal substances contained in the "meal" or "proteid meal" thus produced, are separated therefrom to produce a refined proteid product. This separation of the proteidal substances from the proteid meal may be effected in various ways. According to one method the "meal" is treated with an alkaline solution, such as a dilute solution of caustic or carbonated alkali, or caustic or carbonated ammonia, and the proteidal substances, either with or without further purification of the resulting liquid, are precipitated therefrom. The further purification referred to, may be accomplished by filtration, centrifuging, or the like, by fractional precipitation, fractional solution of precipitated impure proteids, or by converting one or more components into other chemical compounds having different properties which enable their separation to be effected, or one or more of these various purifying methods may be employed in combination with the others. The precipitation of the refined proteidal substances is accomplished by adding a suitable acid, such as sulfuric, sulfurous, acetic or phosphoric, or by adding a suitable ferment, such as lactic or acetic.

According to another method the meal is treated with water and the refined proteidal products are precipitated out of the resulting liquid, either with or without purification thereof, as above explained, the precipitation being effected with an acid or a ferment as above described.

According to still another method the meal is treated with an aqueous salt solution, such as sodium chlorid, ammonium sulfate, or the like, and the resulting liquid either with or without further purification, as explained, is subjected to dialysis.

The proteidal substances obtained as above described are suitable and highly efficient for use in making rubber substitute in accordance with my invention.

In the preparation of the rubber substitute the proteidal substances, obtained as above described, are subjected to the action of a glutinizing agent to produce a sticky viscid mass. I have found the following to be suitable proteid glutinizing agents, namely, (1) inorganic acids, such as phosphoric, sulfurous acid and the like; or (2) fatty or oxy-fatty acids, such as formic, acetic, propionic, phenyl-propionic, malonic, lactic, tartaric, citric, malic, and the like; or (3) aromatic acids such as salicylic, benzoic, or the like; or (4) phenols, such as carbolic acid, cresol, resorcin, nitro-cresol, and the like; or (5) organic bases, such as pyridin, urea, glycin, anilin, naphthylamin, or other amino compounds or the like; or (6) inorganic bases such as caustic alkali, or ammonia; or (7) alkali salts of weak acids, such as borax, sodium phosphate, and the like.

The properties of the mass thus obtained which particularly adapt it for use in the manufacture of rubber substitute, are greatly improved if one or more of the following compounds are added thereto, namely, difficultly drying sticky or viscid substances, such as oxidized oils, triphenyl-glycerin, or the like; or active methylene compounds, such as formaldehyde, hexamethylene-tetramin, trioxymethylene, or other aldehydes of aliphatic and aromatic series.

The properties of the mass thus obtained are still further improved if a small quantity of alkali is added thereto.

To the mass, obtained as above described, is added a suitable vulcanized oil, such as vulcanized castor oil, vulcanized soja bean oil, vulcanized corn oil, or the like.

If desired, and in order to form a body for and to increase the tensile strength of the rubber substitute product, suitable fibrous material, such as waste hemp, cotton, wood fiber, paper, or other similar material preferably though not necessarily, possessing a long strong fiber is added. Also, if desired, any suitable pigment or coloring matter may also be added.

The manner in which my invention is carried out is illustrated in the following illustrative examples.

Example 1. The refined proteidal substances, procured as described, are kneaded with cresol, and the mass is kneaded again after the addition of oxidized castor oil. The resulting mass is kneaded a third time after adding thereto a small quantity of concentrated caustic soda solution, and a suitable quantity of vulcanized castor oil. Finally the mass is rolled hot, or molded, to the desired thickness, size or form.

Example 2. The proteidal substances either in the crude or refined state, are kneaded first with nitro-phenol, and the mass is again kneaded successively with trioxymethylene and caustic soda, and vulcanized castor oil, and the resulting mass is applied under a hot roller to cotton cloth or other fabric, and dried.

It is to be understood, of course, that my invention in its broadest scope, as defined in the claims, is not to be limited to the use of any particular raw material containing vegetable proteids, nor to any particular method of recovering or refining the proteidal substances, nor to any particular glutinizing agent, nor to any particular condensing agent or difficultly drying substance, nor to any particular vulcanized oil. It is also to be understood that in carrying out my invention the proteids may be employed either in their refined or crude state.

The rubber substitute produced as above described is difficultly inflammable. It can be easily rolled into sheets of any desired thickness or size or molded into any desired form, or applied easily, readily and quickly to any suitable cloth or fabric. It is strong, elastic, flexible, tenacious, durable and economical, and can be used in any situation or finished article where rubber or rubber substitute is now used. By suitably varying the proportion of glutinizing or condensing agents employed the degree of hardness or softness of the finished rubber substitute may be controlled.

Having now set forth the objects and nature of my invention and the method of carrying the same into practical operation, what I claim as new and useful, and of my own invention, and desire to secure by Letters Patent is, 1. In the manufacture of rubber substitute the process which consists of glutinizing vegetable proteids and mixing a vulcanized oil with a glutinized mass, and then forming the resulting mass into a sheet.

2. In the manufacture of rubber substitute the process which consists in glutinizing vegetable proteids with a phenol and then mixing a vulcanized oil with the glutinized mass.

3. In the manufacture of rubber substitute the process which consists in glutinizing vegetable proteids then adding a sticky viscid agent and a vulcanized oil to the glutinized mass and finally forming the resulting mass into a sheet.

4. In the manufacture of rubber substitute the process which consists in glutinizing vegetable proteids then adding a sticky viscid agent to the glutinized mass, and finally adding vulcanized castor oil to the mass.

5. In the manufacture of rubber substitute the process which consists in glutinizing vegetable proteids with a phenol, and mixing a vulcanized oil in the glutinized mass and then forming the resulting mass into a sheet.

6. In the manufacture of rubber substitute the process which consists in glutinizing vegetable proteids with a phenol, and then mixing vulcanized castor oil with the glutinized mass.

7. In the manufacture of rubber substitute the process which consists in glutinizing vegetable proteids with a phenol, and then mixing a sticky viscid agent and a vulcanized oil to the glutinized mass.

8. In the manufacture of rubber substitute the process which consists in glutinizing vegetable proteids with a phenol, then mixing a sticky viscid agent with the glutinized mass, and finally mixing vulcanized castor oil with the mass.

9. In the manufacture of rubber substitute the process which consists in glutinizing vegetable proteids, and mixing an active methyelene compound and a vulcanized oil with the glutinized mass.

10. In the manufacture of rubber substitute the process which consists in glutinizing vegetable proteids, and mixing an active methylene compound and vulcanized castor oil with the glutinized mass.

11. In the manufacture of rubber substitute the process which consists in glutinizing vegetable proteids, and mixing a sticky viscid agent, an active methylene compound and a vulcanized oil with the glutinized mass.

12. In the manufacture of rubber substitute the process which consists in glutinizing vegetable proteids with a phenol, and mixing a sticky viscid agent, an active methylene compound and a vulcanized oil with the glutinized mass.

13. In the manufacture of rubber substitute the process which consists in glutinizing vegetable proteids with a phenol, and mixing an oxidized oil and a vulcanized oil to the glutinized mass.

14. In the manufacture of rubber substitute the process which consists in glutinizing vegetable proteids with a phenol, and mixing an oxidized oil an active methylene compound and a vulcanized oil with the glutinized mass.

15. In the manufacture of rubber substitute the process which consists in glutinizing vegetable proteids and then adding triphenyl-glycerin and a vulcanized oil to the mass.

16. In the manufacture of rubber substitute the process which consists in glutinizing vegetable proteids and then adding fibrous material and a vulcanized oil to the glutinized mass.

17. In the manufacture of rubber substitute the process which consists in glutinizing vegetable proteids and then mixing a sticky viscid agent and an active methylene compound and vulcanized castor oil with the glutinized mass.

18. In the manufacture of rubber substitute the process which consists in separating the vegetable proteids from proteid containing material, then glutinizing the separated vegetable proteids and mixing a vulcanized oil with the glutinized mass.

19. In the manufacture of rubber substitute the process which consists in separating in a liquid the vegetable proteids of proteid containing raw material, then precipitating the proteidal substances from the liquid and glutinizing the precipitated vegetable proteidal substances and adding a vulcanized oil to the glutinized mass.

20. As a new article of manufacture, rubber substitute consisting of glutinized vegetable proteidal substances having vulcanized oil incorporated in the glutinized mass.

21. As a new article of manufacture, rubber substitute consisting of glutinized vegetable proteidal substances containing an active methylene compound and vulcanized oil.

22. As a new article of manufacture, rubber substitute consisting of glutinized vegetable proteidal substances containing an active methylene compound and vulcanized castor oil.

23. As a new article of manufacture, rubber substitute consisting of glutinized vegetable proteidal substances containing an oxidized oil and a vulcanized oil.

24. As a new article of manufacture, rubber substitute consisting of glutinized vegetable proteidal substances containing a difficultly drying agent and a vulcanized oil.

25. As a new article of manufacture, rubber substitute consisting of glutinized vegetable proteidal substances containing a sticky viscid agent and vulcanized castor oil.

26. As a new article of manufacture, rubber substitute consisting of glutinized vegetable proteidal substances, an active methylene agent, an oxidized oil and a vulcanized oil.

27. The process of manufacturing rubber substitute which consists in glutinizing vegetable proteids with a proteid glutinizing agent and then adding a vulcanized oil.

28. The process of manufacturing rubber substitute which consists in glutinizing vegetable proteids with a proteid glutinizing agent and then vulcanizing the mass.

29. The process of manufacturing rubber substitute which consists in glutinizing vegetable proteids with a phenol and then vulcanizing the mass.

30. In the manufacture of rubber substitute the process which consists in glutinizing vegetable proteid substances, then treating the glutinized mass with an active methlyene compound and an alkali and finally vulcanizing the mass.

31. In the manufacture of rubber substitute the process which consists in glutinizing vegetable proteid substances, then treating the glutinized mass with an oxidized oil, an active methylene compound and an alkali, and finally vulcanizing the mass.

32. In the manufacture of rubber substitute the process which consists in treating vegetable proteid substances with a phenol, an active methylene compound and an alkali, and adding fibrous material to the glutinized mass and finally vulcanizing the mass.

33. In the manufacture of rubber substitute the process which consists in treating glutinized vegetable proteid substances with a phenol, an oxidizing oil, an active methylene compound and an alkali and finally vulcanizing the mass.

In testimony whereof I have hereunto set my hand on this 1st day of December A. D. 1916.

SADAKICHI SATOW.